United States Patent
Iinuma (10) Patent No.: US 7,075,909 B1
(45) Date of Patent: Jul. 11, 2006

(54) RADIO SPECTRUM MANAGEMENT APPARATUS FOR BASE STATIONS

(75) Inventor: Toshinori Iinuma, Gihu (JP)

(73) Assignee: Sanyo Electric Co., Ltd., Osaka (JP)

( * ) Notice: Subject to any disclaimer, the term of this patent is extended or adjusted under 35 U.S.C. 154(b) by 892 days.

(21) Appl. No.: 09/980,429

(22) PCT Filed: May 31, 2000

(86) PCT No.: PCT/JP00/03495

§ 371 (c)(1),
(2), (4) Date: Nov. 30, 2001

(87) PCT Pub. No.: WO00/74414

PCT Pub. Date: Dec. 7, 2000

(30) Foreign Application Priority Data

May 31, 1999 (JP) .................................. 11/153069

(51) Int. Cl.
*H04L 12/43* (2006.01)
*H04Q 7/20* (2006.01)

(52) U.S. Cl. ...................... 370/329; 370/458; 455/450; 455/522

(58) Field of Classification Search ................ 370/277, 370/286, 294, 345, 347, 442, 458, 915, 508, 370/329, 341, 318, 321, 369, 370, 319; 455/450, 455/452.1, 452.2, 464, 522

See application file for complete search history.

(56) References Cited

U.S. PATENT DOCUMENTS 5,491,833 A    2/1996   Hamabe (Continued)

FOREIGN PATENT DOCUMENTS

GB          2 309 858        8/1997

(Continued)

OTHER PUBLICATIONS

Indoor SDMA capacity using a smart antenna base station Shad, F.; Todd, T.D.; Kezys, V.; Litva, J.; Universal Personal Communications Record, 1997. Conference Record., 1997 IEEE 6th International Conference on vol. 2, Oct. 12-16, 1997 pp. 868-872.*

*Primary Examiner*—Hassan Kizou
*Assistant Examiner*—Brian Roberts (57) ABSTRACT

An access control unit 3 includes a table showing how time slots are currently being assigned to mobile stations that are mid-communication. The access control unit 3 judges whether the reception signal level measured by the reception level detection unit 22 for each mobile station is at least equal to a threshold value. The access control unit 3 then changes the assignment and the table so that the mobile stations having a reception level that is at least equal to the threshold value occupy the same time slot. The access control unit 3 reduces the transmission power during this time slot to a level that is lower than the transmission power of other time slots. By doing so, interference with the transmission waves of nearby radio base stations can be avoided.

6 Claims, 9 Drawing Sheets

U.S. PATENT DOCUMENTS

| | | | |
|---|---|---|---|
| 5,515,378 A * | 5/1996 | Roy et al. | 370/334 |
| 5,909,649 A * | 6/1999 | Saunders | 455/450 |
| 6,008,759 A * | 12/1999 | Tangemann et al. | 342/368 |
| 6,240,098 B1 * | 5/2001 | Thibault et al. | 370/431 |
| 6,321,082 B1 * | 11/2001 | Katz | 455/422.1 |
| 6,337,853 B1 * | 1/2002 | Piolini | 370/329 |
| 6,643,526 B1 * | 11/2003 | Katz | 455/562.1 |
| 2001/0003443 A1 * | 6/2001 | Velazquez et al. | 342/367 |

FOREIGN PATENT DOCUMENTS

| | | |
|---|---|---|
| JP | 09214421 | 8/1997 |

* cited by examiner

| Tch1, f1 | Tch2, f2 | Tch3, f3 | Tch4, f4 |
|---|---|---|---|
| PS1 | PS2 | PS3 | PS4 |
| PS5 | PS6 | PS7 | PS8 |
| PS9 | PS10 | VACANT | VACANT |
| VACANT | VACANT | VACANT | VACANT |
| 125mW×3 | 125mW×3 | 125mW×2 | 125mW×2 |

Fig. 10B  ASSIGNMENT OF PS5 IS CHANGED

| Tch1, f1 | Tch2, f2 | Tch3, f3 | Tch4, f4 |
|---|---|---|---|
| PS1 | PS2 | PS3 | PS4 |
| VACANT | PS6 | PS7 | PS8 |
| PS9 | PS10 | PS5 | VACANT |
| VACANT | VACANT | VACANT | VACANT |
| 125mW×3 | 125mW×3 | 125mW×2 | 125mW×2 |

Fig. 10C  ASSIGNMENT OF PS7 IS CHANGED

| Tch1, f1 | Tch2, f2 | Tch3, f3 | Tch4, f4 |
|---|---|---|---|
| PS1 | PS2 | PS3 | PS4 |
| PS5 | PS6 | VACANT | PS8 |
| PS9 | PS10 | PS5 | VACANT |
| VACANT | VACANT | VACANT | VACANT |
| 125mW×3 | 125mW×3 | 125mW×2 | 125mW×2 |

Fig. 10D  TRANSMISSION POWER IS CHANGED

| Tch1, f1 | Tch2, f2 | Tch3, f3 | Tch4, f4 |
|---|---|---|---|
| PS1 | PS2 | PS3 | PS4 |
| PS5 | PS6 | VACANT | PS8 |
| PS9 | PS10 | PS5 | VACANT |
| VACANT | VACANT | VACANT | VACANT |
| 125mW×3 | 125mW×3 | 5mW×2 | 125mW×2 |

Fig. 10E  FREQUENCY IS CHANGED

| Tch1, f1 | Tch2, f2 | Tch3, f3 | Tch4, f4 |
|---|---|---|---|
| PS1 | PS2 | PS3 | PS4 |
| PS5 | PS6 | VACANT | PS8 |
| PS9 | PS10 | PS5 | VACANT |
| VACANT | VACANT | VACANT | VACANT |
| 125mW×3 | 125mW×3 | 5mW×2 | 125mW×2 |

Fig. 11

RADIO SPECTRUM MANAGEMENT APPARATUS FOR BASE STATIONS

This is a Section 371 National Patent Application based on International Application No. PCT/JP00/03495 filed on May 31, 1999. International Application No. PCT/JP00/03495 is incorporated herein by reference.

FIELD OF THE INVENTION

The present invention relates to a radio base station for wirelessly connecting a plurality of mobile stations in each time slot of a time division multiplex method by space-multiplexing a plurality of transmission signals having different directivity patterns of an adaptive array method.

BACKGROUND OF THE INVENTION

There is an apprehension that the recent upsurge in the number of users of mobile communication services will cause a shortage of frequencies in the near future. Technicians are looking to an adaptive array method as one solution for this problem.

In the adaptive array method, a directivity pattern is adaptively generated using a plurality of antennas so that radio waves are transmitted only to the user located in a specific direction during transmission and radio waves are received only from the user located in a specific direction during reception. The adaptive array method is described in *Adaptive Signal Processing for Spatial Regions and Its Technical Applications* (in "Transactions of the Institute of Electronics, Information and Communication Engineers", Vol. J75-B-II No. 11, November 1992), so that only a brief description is given here. An adaptive array apparatus has a plurality of radio units which each include a transmission circuit, a reception circuit, and an antenna. With this construction, the adaptive array apparatus generates a directivity pattern for transmission and reception by respectively adjusting the amplitude and phase of the transmission signal in each radio unit during transmission and by adjusting the amplitude and phase of the reception signal in each radio unit during reception.

When bidirectional communication is performed using the adaptive array method, it is preferable that devices in communication generate directivity patterns for each other. If the adaptive array method is applied to mobile communication, however, it is impractical for a mobile station to generate directivity patterns due to the physical limitations regarding the scale of the device, the number of antennas, and so on. Therefore, a technique for having a radio base station generate directivity patterns for both reception and transmission has been conceived.

A radio base station employing the adaptive array method can also use a path division multiple access (PDMA) communication method. With the PDMA communication method, radio waves of a plurality of mobile stations are simultaneously multiplexed into one frequency using a plurality of directivity patterns which are respectively generated for the plurality of mobile stations. The PDMA communication method is described in *Path Division Multiple Access (PDMA) Mobile Communication Method* (in "Shingakugihou", RSC93-84 (1994–01), pp 37–44) and so is not described in detail here.

When the adaptive array method is applied to mobile communication, a directivity pattern needs to be adjusted according to changes in propagation circumstances with time due to the movement of a user. When analog processing that uses a conventional phase unit is applied to such a mobile communication, various problems concerning the precision, stability, and trackability are caused. Therefore, it is more realistic for the adaptive array method to be realized by digital signal processing.

Digital signal processing is performed to adjust the amplitude and phase of the signal processed in each radio unit. In the case of a digital phase modulation, the amplitude and phase of each symbol is adjusted by appropriately weighting the inphase component and quadrature component of each symbol processed in each radio unit. Accordingly, the signal processing is mainly performed to calculate the weighting factors for the inphase and quadrature components processed in each radio unit. The inphase component and quadrature component of each symbol are hereinafter simply referred to as an I component and a Q component, respectively.

To efficiently use frequencies, it is desired that a radio base station employing the adaptive array method not only generates a plurality of directivity patterns for the same frequency but also avoids interference with nearby radio base stations.

The object of the present invention is therefore to provide a radio base station that efficiently uses frequencies by avoiding interference with the transmission waves of nearby radio base stations.

SUMMARY OF THE INVENTION

The stated object is achieved by a radio base station for wirelessly connecting mobile stations in each time slot of a time division multiplex method by space-multiplexing a plurality of transmission signals having different directivity patterns of an adaptive array method, the radio base station including: a storage unit for storing a table showing how time slots are assigned mobile stations that are wirelessly connected; a measuring unit for measuring a reception level of a signal received from each mobile station shown in the table; a judging unit for judging whether a reception level is no less than a threshold value; a changing unit for changing an assignment of the mobile stations and the table so that mobile stations which each have a reception level no less than the threshold value occupy a same time slot; and a control unit for reducing the transmission power during a time slot, which is occupied by the mobile stations that each have a reception level no less than the threshold value, to a level that is lower than the transmission power of other time slots.

With this construction, the control unit changes the assignment of channels so that the mobile stations having a high reception level (located near the radio base station) occupy the same time slot, and reduces the transmission power during this time slot to a low level. By doing so, the radio base station avoids interference with the frequencies of nearby radio base stations.

Here, if it is judged that the reception level of any mobile station in the time slot, which is occupied by the mobile stations that each have a reception level no less than the threshold value, falls below the threshold value due to a movement of the mobile station, the control unit may put the transmission power during the time slot back to an original level.

With this construction, the radio base station appropriately adjusts the transmission power according to the movement of a mobile station.

Here, the radio base station may further include: a signal processing unit for calculating a plurality of sets of parameters used for space-multiplexing, the plurality of sets of parameters respectively corresponding to a plurality of antennas composing an adaptive array antenna, where the measuring unit includes: an electric field strength detecting unit for detecting an electric field strength of a signal received in each time slot; and a reception level detecting unit for detecting a reception level of a signal received from each mobile station, which is space-multiplexed in each time slot, according to the detected electric field strength and the calculated plurality of sets of parameters.

With this construction, the radio base station appropriately detects the reception signal level of each mobile station that is space-multiplexed in each time slot.

Here, the control unit may change a frequency during the time slot occupied by the mobile stations that each have a reception level no less than the threshold value to a frequency used for a low-power transmission.

With this construction, if available frequencies are classified into low-power frequencies used for low-power transmission and normal power frequencies used for normal power transmission, the radio base station appropriately switches between the low-power frequencies and the normal power frequencies. This further reduces interference with the frequencies of nearby radio base stations.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

Figure 1:
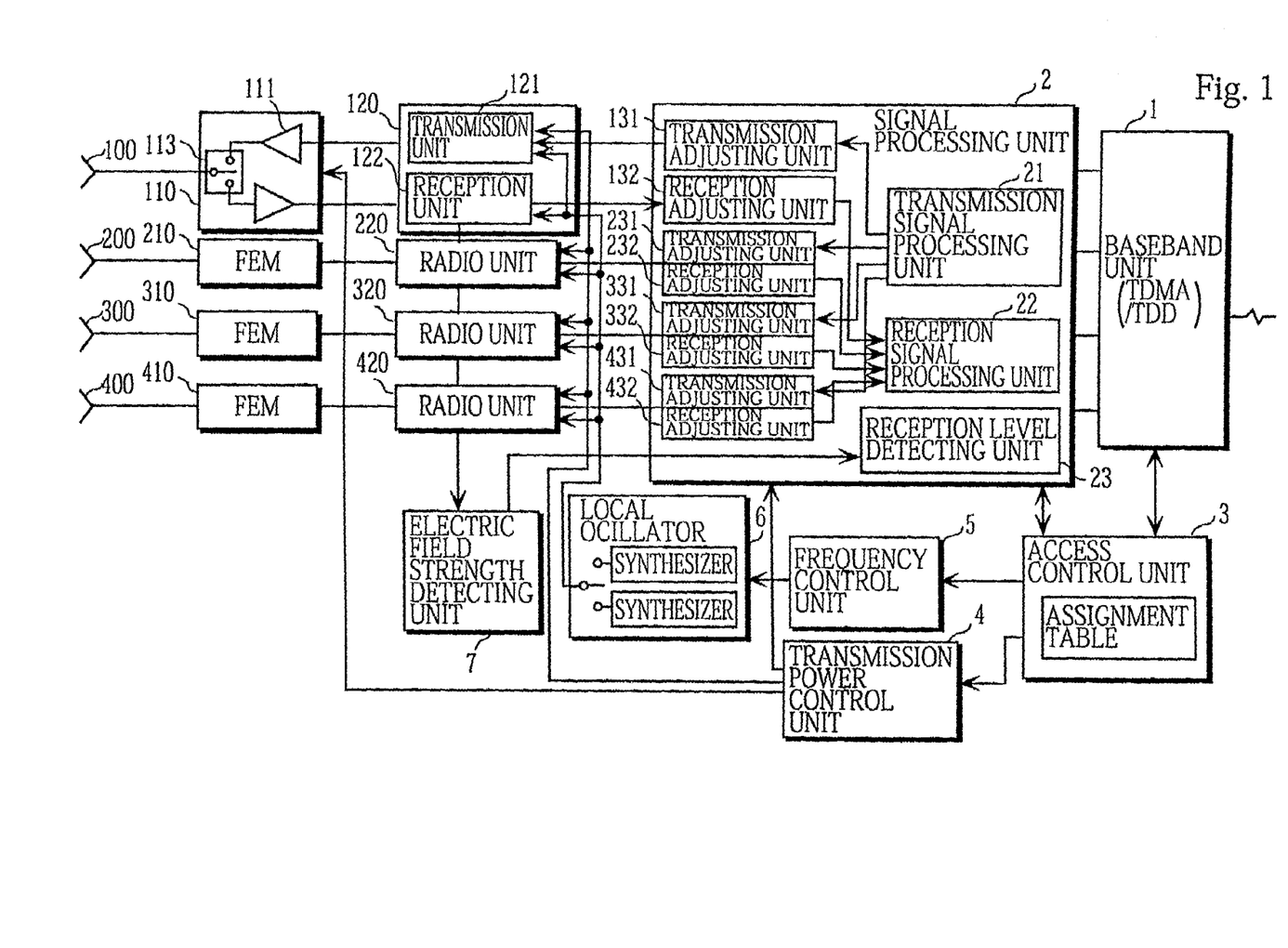
FIG. 1 is a block diagram showing the construction of a radio base station of an embodiment of the present invention.

FIG. 1 is a block diagram showing the construction of a radio base station of an embodiment of the present invention.

This radio base station employs the adaptive array method and is provided as a base station for mobile communication involving digital portable telephones. As shown in FIG. 1, the radio base station includes a baseband unit 1, a signal processing unit 2, an access control unit 3, a transmission power control unit 4, a frequency control unit 5, a local oscillator 6, an electric field strength detecting unit 7, antennas 100, 200, 300, and 400, FEMs (Front End Modules) 110, 210, 310, and 410, and radio units 120, 220, 320, and 420.

The antennas 100–400 simultaneously transmit transmission waves to the same mobile stations and simultaneously receives reception waves from the same mobile stations. In this embodiment, transmission power of these antennas is adjusted according to the distance between the radio base station and mobile stations in each time division time slot in which path multiplexing is performed.

The FEM 110 includes a HPA (high power amplifier) 111 that amplifies a high frequency signal (hereinafter abbreviated to the "RF signal") sent from the radio unit 120 to obtain a signal at a transmission power level, a LNA (low noise amplifier) 112 that amplifies an RF signal received from a mobile station, and an antenna switch 113 that connects the antenna 100 to the HPA 111 during transmission and connects the antenna 100 to the LNA 112 during reception.

The FEMs 210–410 respectively have the same construction as the FEM 110 and so are not described here.

The radio unit 120 includes a transmission unit 121 that modulates a baseband signal (a symbol data string) sent from the transmission adjusting unit 131 of the signal processing unit 2 to obtain an RF signal and outputs the RF signal to the HPA 111, and a reception unit 122 that demodulates a reception RF signal from the LNA 112 to obtain a baseband signal (a symbol data string). The frequency of the RF signal is determined by the local frequency signal from the local oscillator 6. Here, the radio unit 120 may use any type of digital modulation and demodulation method, such as $\pi/4$ shift QPSK (Quadrature Phase Shift Keying). In the present embodiment, the baseband signal is time series data represented by the I component and Q component of each symbol.

The radio units 220–420 respectively have the same construction as the radio unit 120 and so are not described here.

The baseband unit 1 relays a plurality of baseband signals (voice or data) between the signal precessing unit 2 and a plurality of lines connected via a telephone switching network. In this embodiment, a plurality of baseband signals (up to four baseband signals) are path-multiplexed in each time division time slot (each frame is divided into four channels). Therefore, the baseband unit 1 exchanges up to four baseband signals with the signal processing unit 2 for each time division channel and exchanges up to 16 baseband signals with the telephone switching network. Which time division channel is assigned to a baseband signal (which baseband signal is multiplexed over a time division channel) is shown by an assignment table 31 in the access control unit 3.

Figure 2A:
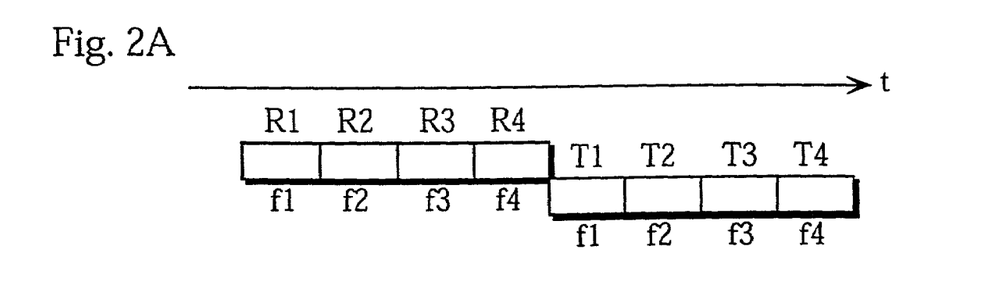
FIG. 2 shows the relation between path multiplexing and a TDMA/TDD (Time Division Multiple Access/Time Division Duplex) frame.
Figure 2B:
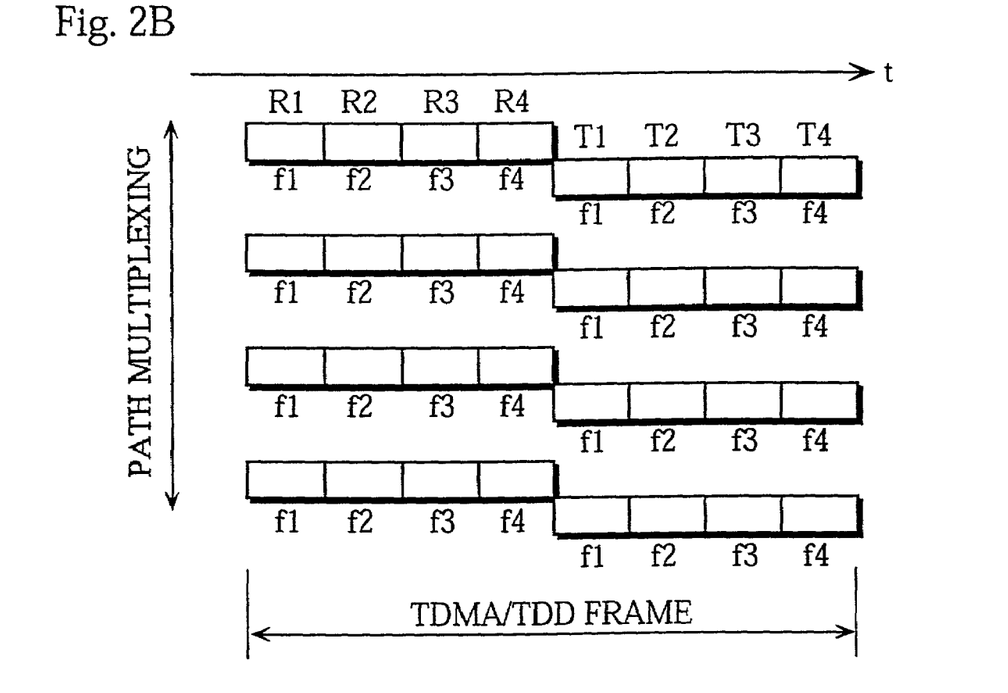

FIG. 2A shows a TDMA/TDD (Time Division Multiplex Access/Time Division Duplex) frame where path multiplexing is not performed. Each TDMA/TDD frame is five milliseconds in length and is divided into eight slots. Slots R1–R4 are assigned to uplink communication (communication from a mobile station to the base station), while slots T1–T4 are assigned to downlink communication (communication from the base station to a mobile station). For instance, the slot R1 makes up one time division channel with the slot T1. Frequencies f1–f4 of the time division channels may be set as the same frequency as well as different frequencies because the frequencies f1–f4 only need to be selected from frequencies that are not currently used by nearby radio stations. FIG. 2B shows a TDMA/TDD frame where path multiplexing is performed. As shown in this drawing, each time division channel can be simultaneously assigned to up to four mobile stations if the path multiplexing is performed. Each channel that is path-multiplexed in a time division channel is hereinafter referred to as the "path channel" (or simply referred to as the "channel").

The signal processing unit 2 performs the path multiplexing (signal processing) for each time division channel. To do so, the signal processing unit 2 includes transmission adjusting units 131, 231, 331, and 431, reception adjusting units 132, 232, 332, and 432, a transmission signal processing unit 21, a reception signal processing unit 22, and a reception level detecting unit 23. The transmission adjusting units 131, 231, 331, and 431 respectively adjust the phase and amplitude of the transmission baseband signal to be sent to the corresponding antenna. The reception adjusting units 132, 232, 332, and 432 respectively adjust the phase and amplitude of the reception baseband signal sent from the corresponding antenna. The transmission signal processing unit 21 generates an adjustment value for each path-multiplexed user and inputs the adjustment value into the transmission adjusting units. The reception signal processing unit 22 generates an adjustment value for each path-multiplexed user and inputs the adjustment value into the reception adjusting units. The reception level detecting unit 23 detects a reception signal level for each path-multiplexed user. In FIG. 1, the signal processing unit 2 is divided into functional blocks for ease of explanation. In reality, however, the main construction element of the signal processing unit 2 is a DSP (Digital Signal Processor) and the functions of these blocks are realized by executing programs.

Figure 10A:
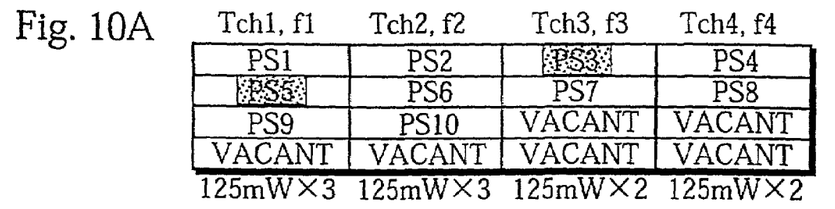
FIG. 10 shows a state where the content of an assignment table is changed.

The access control unit 3 includes the assignment table 31 showing the allocation of path channels to mobile stations, and changes the allocation so that mobile stations located near the radio base station, out of mobile stations that are mid-communication, occupy the same time division channel. FIG. 10A shows an example of the assignment table 31. In this drawing, Tch1–Tch4 represent the time division channels shown in FIG. 2B and f1–f4 represent frequencies assigned to the time division channels. The assignment table 31 holds identifiers of mobile stations that are mid-communication over each time division channel. For instance, mobile stations PS1, PS5, and PS9 are path-multiplexed on the time division channel Tch1.

The access control unit 3 judges whether mobile stations that are mid-communication are located near the radio base station by checking whether the reception signal level of each mobile station detected by the reception level detecting unit 23 is at least equal to a threshold value. Here, the threshold value is determined by adding a margin to the minimum reception signal level for a mobile station located within a radio area where the radio base station is able to communicate with mobile stations using a transmission power that is lower than a normal transmission power used for mobile stations positioned further from the base station.

Figure 9A:
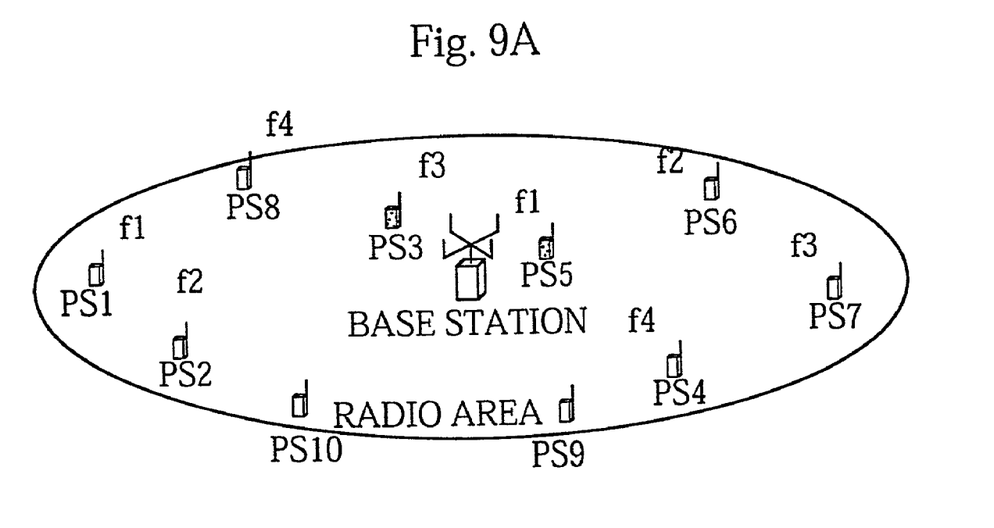
FIG. 9 shows an example state where mobile stations that are mid-communication are located around the radio base station.
Figure 9B:
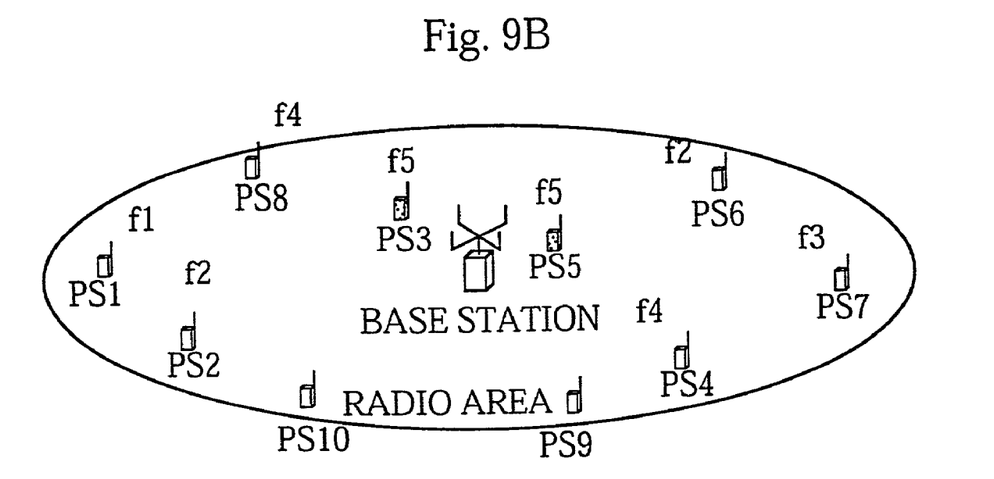
Figure 10B:
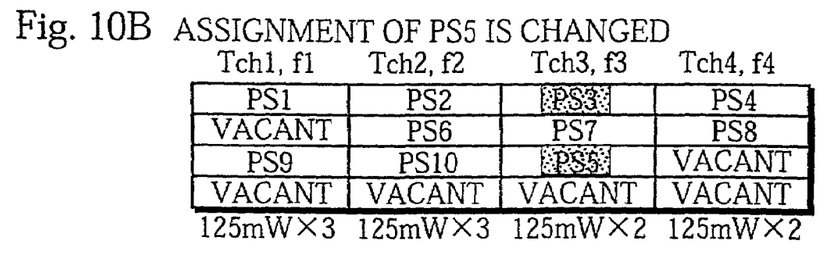
Figure 10C:
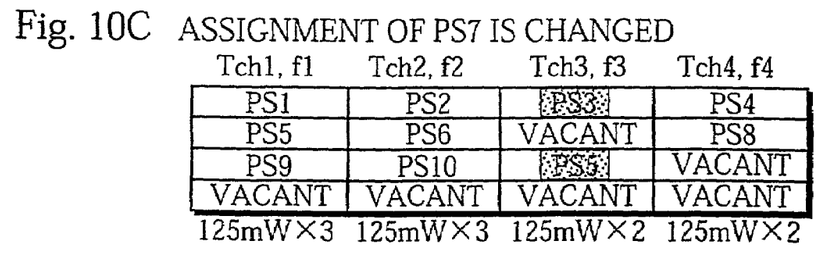

After the reception signal level judgement, the access control unit 3 changes the assignment of time division channels to mobile stations so that mobile stations whose reception signal levels have been judged as at least equal to the threshold value occupy the same time division channel. For instance, if the mid-communication mobile stations PS3 and PS5 are located near the base station as shown in FIG. 9A and these mobile stations are assigned different time division channels as shown in the assignment table 31 in FIG. 10A, the access control unit 3 changes the assignment so that PS3 and PS5 occupy the same time division channel as shown in FIGS. 10B and 10C.

The access control unit 3 then sends, to the transmission power control unit 4, a notification that the mobile stations whose reception signal levels have been judged as at least equal to the threshold value occupy the same time division channel. On receiving this notification (hereinafter referred to as the "low-power switch notification"), the transmission power control unit 4 reduces the transmission power of the corresponding time division channel to a level that is lower than the normal transmission power. A time division channel with the low transmission power is hereinafter referred to as the "low-power slot".

If the reception signal level of any mobile station assigned the time division channel with the low transmission power falls below the threshold value, the access control unit 3 sends the notification of this to the transmission power control unit 4. On receiving this notification (hereinafter referred to as the "normal power switch notification"), the transmission power control unit 4 increases the transmission power during this time division channel to the normal level (the normal transmission power).

The access control unit 3 also sends a small cell frequency switch notification to the frequency control unit 5 before the low-power switch notification is sent, and sends a large cell frequency switch notification to the frequency control unit 5 before the normal power switch notification is sent. Here, "small cell frequencies" refer to frequencies that are used for small cells, out of frequencies available for communication between the radio base station and mobile stations (in the case of PHS, a small cell means a radio area where communication takes place with a transmission power of 20 mW). Also, "large cell frequencies" refer to frequencies that are used for large cells, out of the available frequencies (in the case of PHS, a large cell means a radio area where communication takes place with a transmission power that exceeds 20 mW and is no more than 500 mW). Normally, the large cell frequencies are used for both large cells and small cells and the small cell frequencies are used only for small cells, with the use of the small cell frequencies for large cells being prohibited. In readiness for the case where available frequencies are classified into large cell frequencies and small cell frequencies, the access control unit 3 sends the small cell frequency switch notification and the large cell frequency switch notification to the frequency control unit 5.

The transmission power control unit 4 reduces, on receiving the low-power switch notification from the access control unit 3, the transmission power of the corresponding time division channel to a low level (the low transmission power). On receiving the normal power switch notification from the access control unit 3, the transmission power control unit 4 increases the transmission power of the corresponding time division channel to the normal level. Here, in the case where a non-directional transmission wave is generated by a conventional radio base station, the normal transmission power (the transmission power at the normal level) is around 500 mW, and in the case where an adaptive array radio base station has four antennas like the present embodiment, the normal transmission power of four antennas per user is around 125 mW in total. Also, in the case where a non-directional transmission wave is generated by a conventional radio base station, the low transmission power is around 20 mW, and in the case where an adaptive array radio base station has four antennas like the present embodiment, the low transmission power of four antennas per user is around 5 mW in total. The transmission power of each antenna is determined by multiplying the gain of the corresponding HPA by the gain of the corresponding transmission unit and the amplitude of symbol data that has been adjusted by the corresponding transmission adjusting unit. Therefore, the transmission power control unit 4 switches the level of the transmission power of each antenna between the normal level and the low level by adjusting the stated gains and amplitude.

The frequency control unit 5 controls the local oscillator 6 to generate transmission and reception frequencies that are appropriate to each time division channel by switching between two frequency synthesizers in the local oscillator 6. On receiving a small cell frequency switch notification from the access control unit 3, the frequency control unit 5 also switches the frequency of the corresponding time division channel from a large cell frequency to a small cell frequency. On receiving a large cell frequency switch notification from the access control unit 3, the frequency control unit 5 further switches the frequency of the corresponding time division channel from a small cell frequency to a large cell frequency. It should be noted here that even if receiving a small cell frequency switch notification, the access control unit 3 does not necessarily need to switch the corresponding frequency to a small cell frequency.

The electric field detecting unit 7 detects the electric field strength of the signal received by each antenna from the signal processed in the reception unit of the corresponding radio unit. The detected electric field strength represents the total reception signal level of a plurality of path-multiplexed mobile stations. The reception signal level of each path-multiplexed mobile station is detected by the reception level detecting unit 23.

<Signal Processing Unit>

The signal processing unit 2 includes the transmission adjusting units 131, 231, 331, and 431, the reception adjusting units 132, 232, 332, and 432, the transmission signal processing unit 21, the reception signal processing unit 22, and the reception level detecting unit 23.

<Transmission Adjusting Unit 131>

Figure 3:
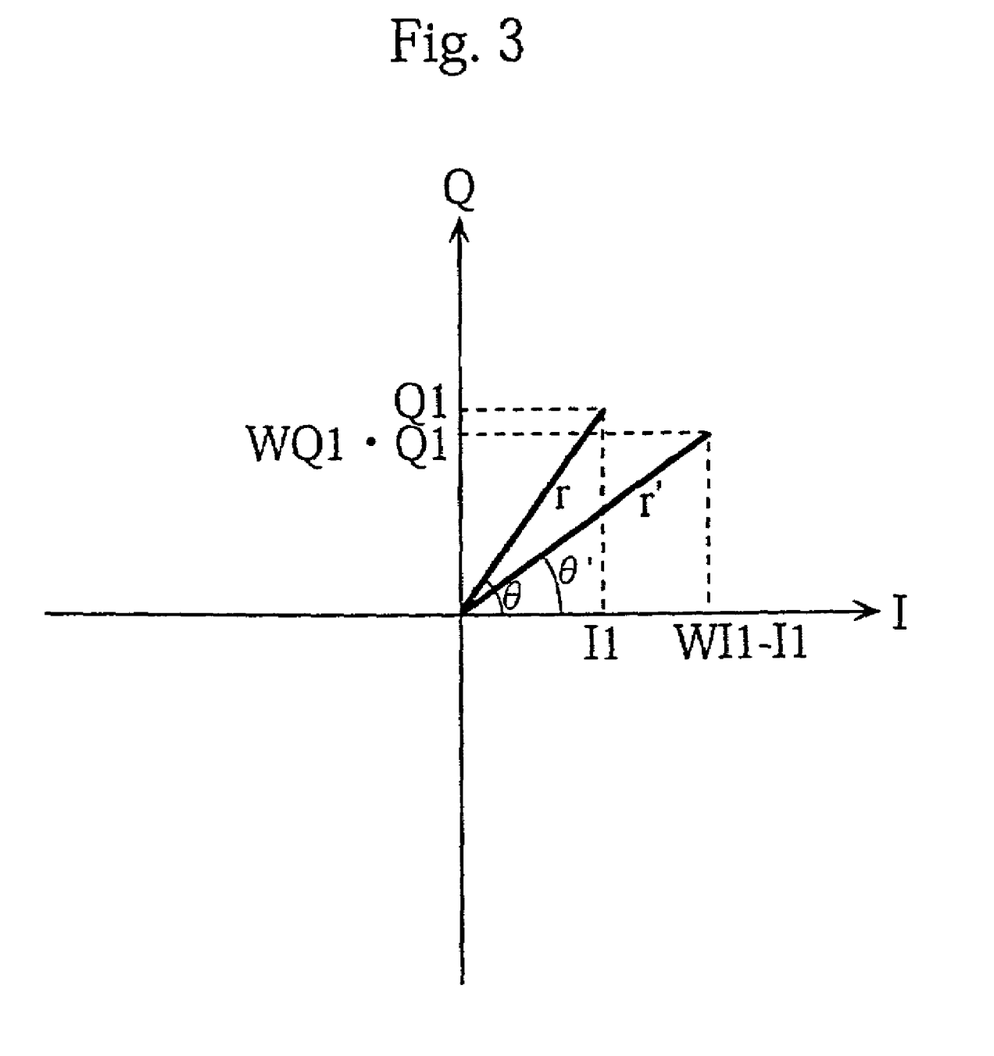
FIG. 3 shows a state where symbol data is adjusted by weighting the symbol data.

The transmission adjusting unit 131 receives each baseband signal from the transmission signal processing unit 21 and adjusts the amplitudes and phases of the baseband signals to generate directivity patterns based on the adaptive array method. More specifically, because each baseband signal sent from the transmission signal processing unit 21 is represented by an I component and a Q component of one symbol, the transmission adjusting unit 131 adjusts the amplitude and phase of the transmission wave to be transmitted from the antenna 100 by respectively weighting, for the antenna 100, the I and Q components of each baseband signal to be path-multiplexed. FIG. 3 shows a state where a symbol is adjusted by weighting the I and Q components of the symbol. In this drawing, a symbol before and after the weighting is shown on an I-Q coordinate plane. I1 and Q1 respectively represent the I and Q components of the symbol that have not been weighted. WI1 and WQ1 respectively represent weighting factors used to weight the I and Q components of the symbol. WI1*I1 and WQ1*Q1 respectively represent the I and Q components of the symbol that have been weighted.

Figure 4:
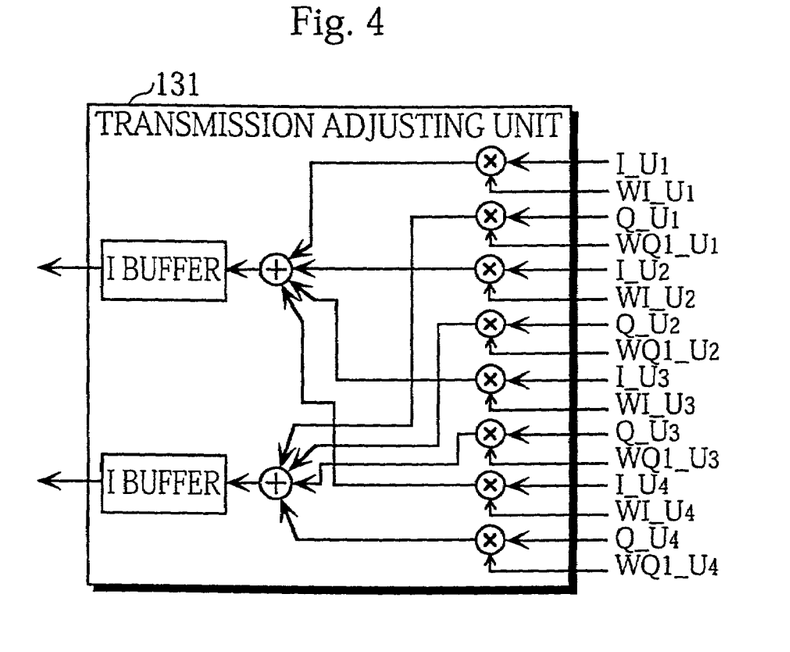
FIG. 4 is a block diagram showing the detailed construction of a transmission adjusting unit.

FIG. 4 is a block diagram showing the detailed construction of the transmission adjusting unit 131. In this drawing, I_U1 and Q_U1 respectively represent the I and Q components of a transmission symbol for a user 1 sent from the transmission signal processing unit 21. Similarly, I_U2 and Q_U2 respectively represent the I and Q components of a transmission symbol for a user 2, I_U3 and Q_U3 respectively represent the I and Q components of a transmission symbol for a user 3, and I_U4 and Q_U4 respectively represent the I and Q components of a transmission symbol for a user 4. Here, the users 1–4 refer to four mobile stations that can be path-multiplexed over the same time division channel.

Also, in FIG. 4, WI1_U1 and WQ1_U1 respectively represent the weighting factors corresponding to the I and Q components for the user 1 sent from the transmission signal processing unit 21. Similarly, WI1_U2 and WQ1_U2 respectively represent the weighting factors corresponding to the I and Q components for the user 2, WI1_U3 and WQ1_U3 respectively represent the weighting factors corresponding to the I and Q components for the user 3, and WI1_U4 and WQ1_U4 respectively represent the weighting factors corresponding to the I and Q components for the user 4.

As shown in FIG. 4, the transmission adjusting unit 131 includes eight multipliers that weight the I and Q components for each user, two adders that respectively adding (combining) four I components and four Q components that have been weighted, an I buffer that holds the combined I components of at least one symbol, and a Q buffer that holds the combined Q components of at least one symbol. With this construction, for the antenna 100, the transmission adjusting unit 131 adjusts and combines the phases and amplitudes of transmission symbol data for each user.

The transmission adjusting units 231, 331, and 431 respectively have the same construction as the transmission adjusting unit 131. However, the transmission adjusting units 231, 331, and 431 respectively receive weighting factors for the antennas 200, 300, and 400 from the transmission signal processing unit 21.

<Reception Adjusting Unit>

The reception adjusting unit 132 adjusts the amplitude and phase of reception baseband signal inputted from the radio unit 120 according to the weighting factors sent from the signal processing unit 2 to generate directivity patters for reception. The adjustment of the amplitude and phase of the reception baseband signal is performed by respectively weighting the I and Q components of the reception baseband signal. If a plurality of mobile stations are path-multiplexed over the same time division channel, the signal precessing unit 2 generates weighting factors for each mobile station and the reception adjusting unit 132 weights the I and Q components of symbol data for each mobile station using the corresponding weighting factors.

Figure 5:
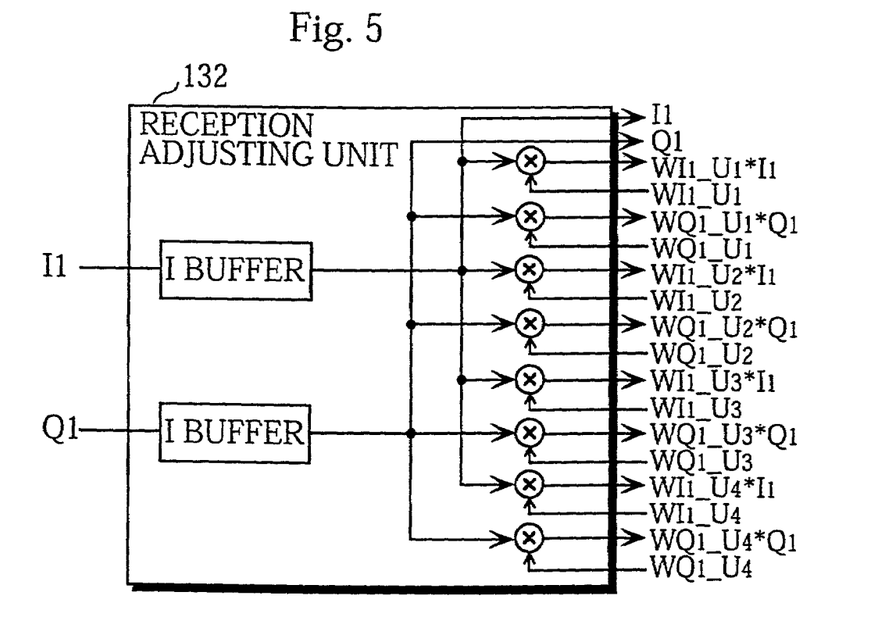
FIG. 5 is a block diagram showing the detailed construction of a reception adjusting unit.

FIG. 5 is a block diagram showing the detailed construction of the reception adjusting unit 132. As shown in this drawing, the reception adjusting unit 132 includes an I buffer that temporarily holds I components of at least one reception symbol sent from the radio unit 120, a Q buffer that temporarily holds Q components of at least one reception symbol sent from the radio unit 120, and eight multipliers. In this drawing, I1 and Q1 respectively represent the I and Q components of the reception symbol that is sent from the radio unit 120 to the I and Q buffers of the reception adjusting unit 132. WI1_U1 and WQ1_U1 respectively represent weighting factors that correspond to the I and Q components for the user 1 and are sent from the reception signal processing unit 22. Similarly, WI1_U2 and WQ1_U2 respectively represent weighting factors corresponding to the I and Q components for the user 2, WI1_U3 and WQ1_U3 respectively represent weighting factors corresponding to the I and Q components for the user 3, and WI1_U4 and WQ1_U4 respectively represent weighting factors corresponding to the I and Q components for the user 4.

As shown in FIG. 5, within the reception adjusting unit 132, the multipliers multiply the I and Q components of reception symbol data sent from the radio unit 120 by separate weighting factors for each user. In this manner, the I and Q components are appropriately weighted for each user.

The reception adjusting units 232, 332, and 432 respectively have the same construction as the reception adjusting unit 132. However, the reception adjusting units 232, 332, and 432 respectively receive reception symbol data from the radio units 220, 320, and 420, and respectively receive weighting factors corresponding to the antennas 200, 300, and 400 from the reception signal processing unit 22.

<Transmission Signal Processing Unit 21>

The transmission signal processing unit 21 receives baseband signals for each time division channel from the baseband unit 1 and distributes the baseband signals to the transmission adjusting units 131, 231, 331, and 431. The transmission signal processing unit 21 also generates weighting factors for transmission dedicated to each transmission adjusting unit and each baseband signal, and outputs the weighting factors to the corresponding transmission adjusting unit. More specifically, the transmission signal processing unit 21 temporarily accumulates weighting factors for reception that have been calculated by the reception signal processing unit 22 in reception time slots, and reads the accumulated weighting factors and outputs them to the transmission adjusting units in transmission time slots.

<Reception Signal Processing Unit 22>

The reception signal processing unit 22 calculates weighting factors for each user to be path-multiplexed according to reception baseband signal sent from each antenna via the corresponding FEM and radio unit, and calculates symbol data of each user from the symbol data that has been adjusted by each reception adjusting unit according to the calculated weighting factors.

Figure 6:
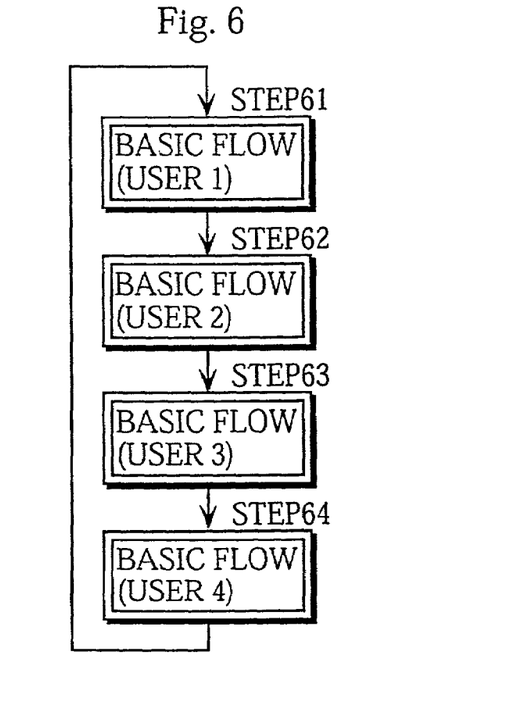
FIG. 6 is a simplified flowchart showing the processing of a reception signal processing unit.

FIG. 6 is a flowchart showing the outline of the processing of the reception signal processing unit 22. The basic flow in each step in this flowchart shows signal processing performed by the reception signal processing unit 22 in one symbol period. In each symbol period, the reception signal processing unit 22 performs the basic flow for each of the users 1–4 to be path-multiplexed over the same time division channel (steps 61–64).

Figure 7:
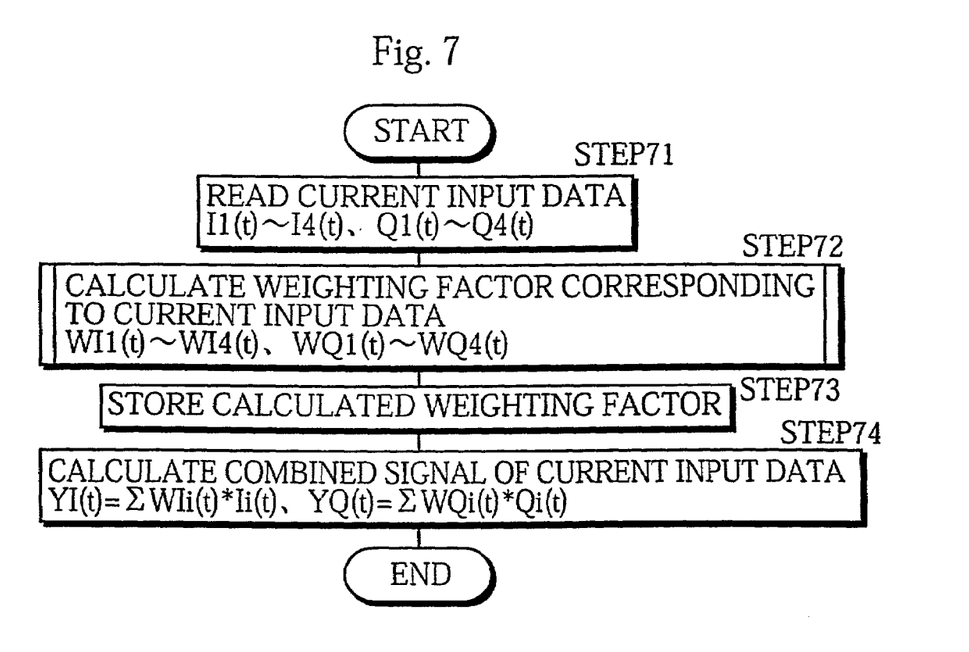
FIG. 7 is a detailed flowchart of a basic flow shown in FIG. 6.

FIG. 7 is a detailed flowchart of the basic flow shown in FIG. 6. The following description takes the case of the user 1 as an example.

As shown in this drawing, the reception signal processing unit 22 reads I and Q components obtained at the current symbol time "t", which is to say I1 (t) to I4 (t) and Q1 (t) to Q4 (t), from I and Q buffers of all reception adjusting units (step 71). Then the reception signal processing unit 22 calculates weighting factors corresponding to the current symbol form the read I and Q components (step 72), and stores the calculation results, which is to say WI1_U1 (t) to WI4_U1 (t) and WQ1_U1 (t) to WQ4_U1 (t), into an internal buffer (step 73). The reception signal processing unit 22 sends the calculation results to each reception adjusting unit and calculates combined signals for the user 1 at the current symbol time "t" using the symbol data, WI1_U1 (t)*I1 (t) to WI4_U1 (t)*I1 (t) and WQ1_UT (t)* I1 (t) to WQ4_U1 (t)*I1 (t), which have been weighted by each reception adjusting unit (step 74). The combined signals, YIa (t) and YQa (t), for the user 1 at the symbol time "t" are obtained from "YIa(t)=ΣWIi_U1(t)*Ii (t)" and "YQa(t)=ΣWQi_U1(t)*Qi(t)" (i is an integer from one to four). The combined signals represent a symbol received at the symbol time "t" using the directivity pattern for the user 1. That is, the combined signals represent the received symbol after received signals of other users have been removed.

Figure 8:
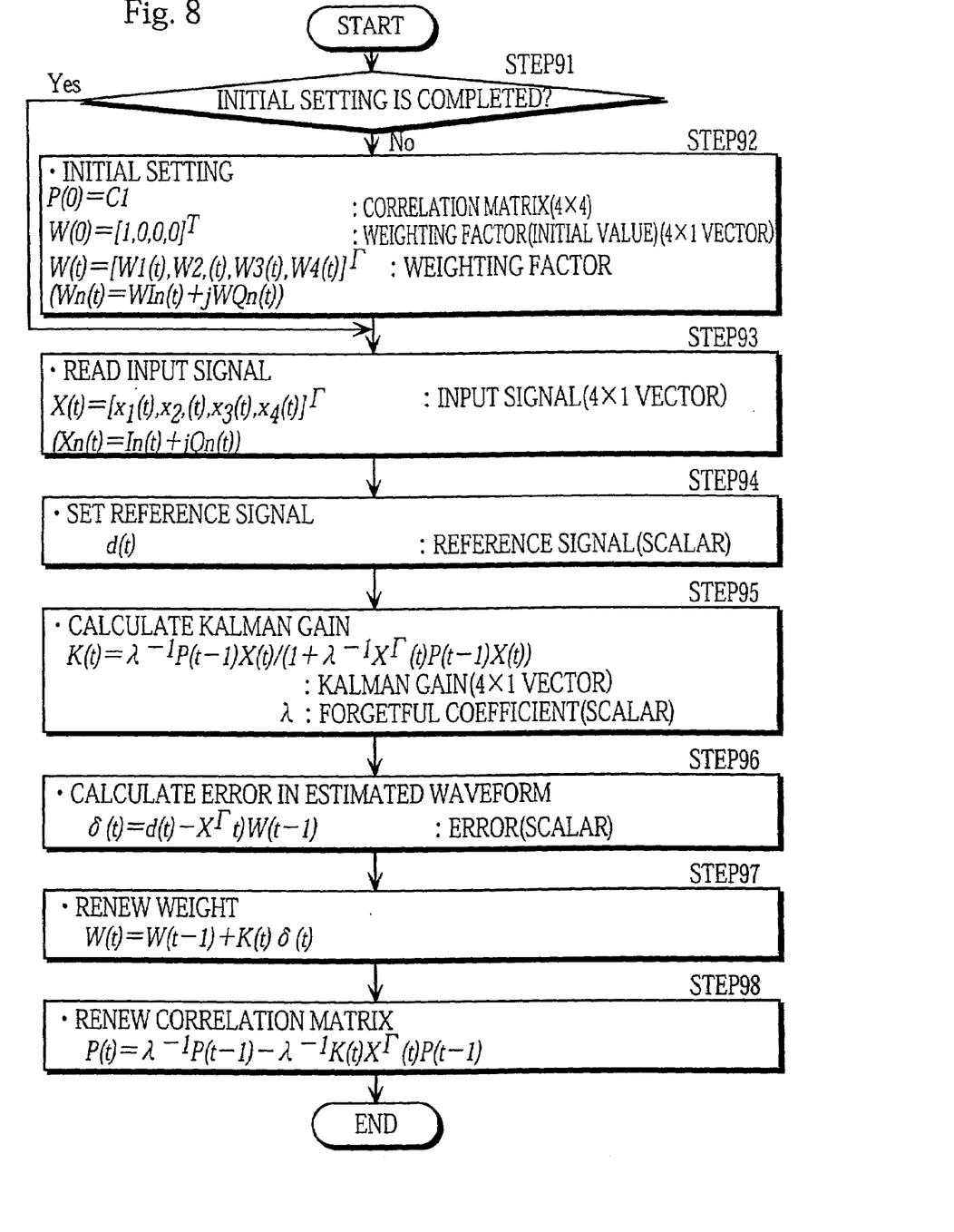
FIG. 8 is a detailed flowchart of weighting factor calculation.

FIG. 8 is a detailed flowchart of the weighting factor calculation performed in step 72 in FIG. 7.

The processing in this drawing uses a publicly known technique for performing the adaptive array method using a Kalman filter. This technique is described in detail in *Analysis of Adaptive Antenna Using Kalman Filter* (in "Transactions of the Institute of Electronics, Information and Communication Engineers", B-II, Vol. J75-B-II No. 11, pp 835–843, November 1992), and so is only described briefly below.

The reception signal processing unit 22 performs initialization if this has not already been performed (steps 91 and 92). During the initialization, the initial value P(0) of the estimation error dispersion matrix of a Kalman filter and the initial value W(0) of the weighting factor matrix are set. In this embodiment, the initial value P(0) is C*I (C is a constant and I is a 4×4 unit matrix) and the initial value W(0) is 4×1 vector shown in this drawing. In this case, the weighting factor matrix W(t) is expressed as the 4×1 vector shown in this drawing.

The reception signal processing unit 22 then sets I and Q components at the symbol time "t" obtained from the I and Q buffers of all reception adjusting units as input signals (step 93) and sets reference signal d(t) (step 94).

Here, the reference signal d(t) is an estimated waveform of reception signal that should be obtained from a specific user. When the reception signal at the symbol time "t" is known data, such as the preamble or the user ID of reception data, the reception signal processing unit 22 sets the waveform of the reception signal as the estimated waveform.

On the other hand, when the reception signal at the symbol time "t" is unknown data, the reception signal processing unit 22 temporarily determines the reception symbol (reception data), and sets the waveform of the reception symbol as the estimated waveform. Here, the reception signal Y(t) that is temporarily determined is obtained by multiplying I and Q components corresponding to the symbol time "t" by previously calculated weighting factors and by combining the multiplied I and Q components. In the case where the waveform of known data, such as the preamble of reception data, is set as the estimated waveform, the same symbol data is obtained for every user. However, different symbol data can be obtained for each user by staggering the symbol timing for each user in the TDMA/TDD frame by several symbols.

The reception signal processing unit 22 then calculates Kalman gains and the error of the estimated waveform, and renews weighting factors and correlation matrixes (steps 95–98), as shown in this drawing. The process in steps 95–98 is performed with a known technique where a recursive least square (RLS) method (RLS algorithm) is applied to a Kalman filter and so is not described here.

In this manner, the reception signal processing unit 22 calculates weighting factors for each user.

<Reception Level Detecting Unit>

The reception level detecting unit 23 detects the reception signal level of each user (mobile station) that are path-multiplexed in the reception time slot of the same time division channel from the electric field strength detected for each antenna by the electric field strength detecting unit 7 and weighting factors calculated by the reception signal processing unit 22.

If the electric field strengths of respective antennas are expressed as RSSI1–RSSI4, the input signals of respective antennas are expressed as X1(t)–X4(t), and the demodulation data of respective users is expressed as U1(t)–U4(t), the reception signal level of each user ($L\_U_1$, $L\_U2$, $L\_U3$, or $L\_U4$) is obtained from the following expressions.

$$L\_U1 = \Sigma\{RSSIn \times ABS(\Sigma Xn(t)*U1(t))\}$$

$$L\_U2 = \Sigma\{RSSIn \times ABS(\Sigma Xn(t)*U2(t))\}$$

$$L\_U3 = \Sigma\{RSSIn \times ABS(\Sigma Xn(t)*U3(t))\}$$

$$L\_U4 = \Sigma\{RSSIn \times ABS(\Sigma Xn(t)*U4(t))\}$$

Here, in each expression, the first $\Sigma$ represents the sum for n=1, 2, 3, 4 and the second $\Sigma$ represents the sum for t=1, 2, . . . ,M (M represents the number of symbols in one slot).

The input signal (input symbol) of each antenna is expressed by "Xn(t)=In(t)+jQn(t)", as shown in step 93 in FIG. 8. The demodulation data of the user 1 is expressed by "U1(t)=YIa(t)+jYQa(t)" (YIa(t) and UQa(t) have been described above). Also, in the above expressions, ABS(X) represents the complex amplitude of X (that is, SQRT(I2+ Q2)), and "*" represents a calculation for obtaining the degree of correlation. The input symbol "Xn(t)" as well as the demodulation data of a user "Ui4(t) (i=1, 2, 3, 4)" can be expressed by binarized I and Q components. Therefore, the correlation can be obtained from a simple calculation and a complex number of calculation results can be obtained.

In the manner described above, the reception level detecting unit 23 detects the reception signal level for each user.

<Access Control Unit>

Figure 11:
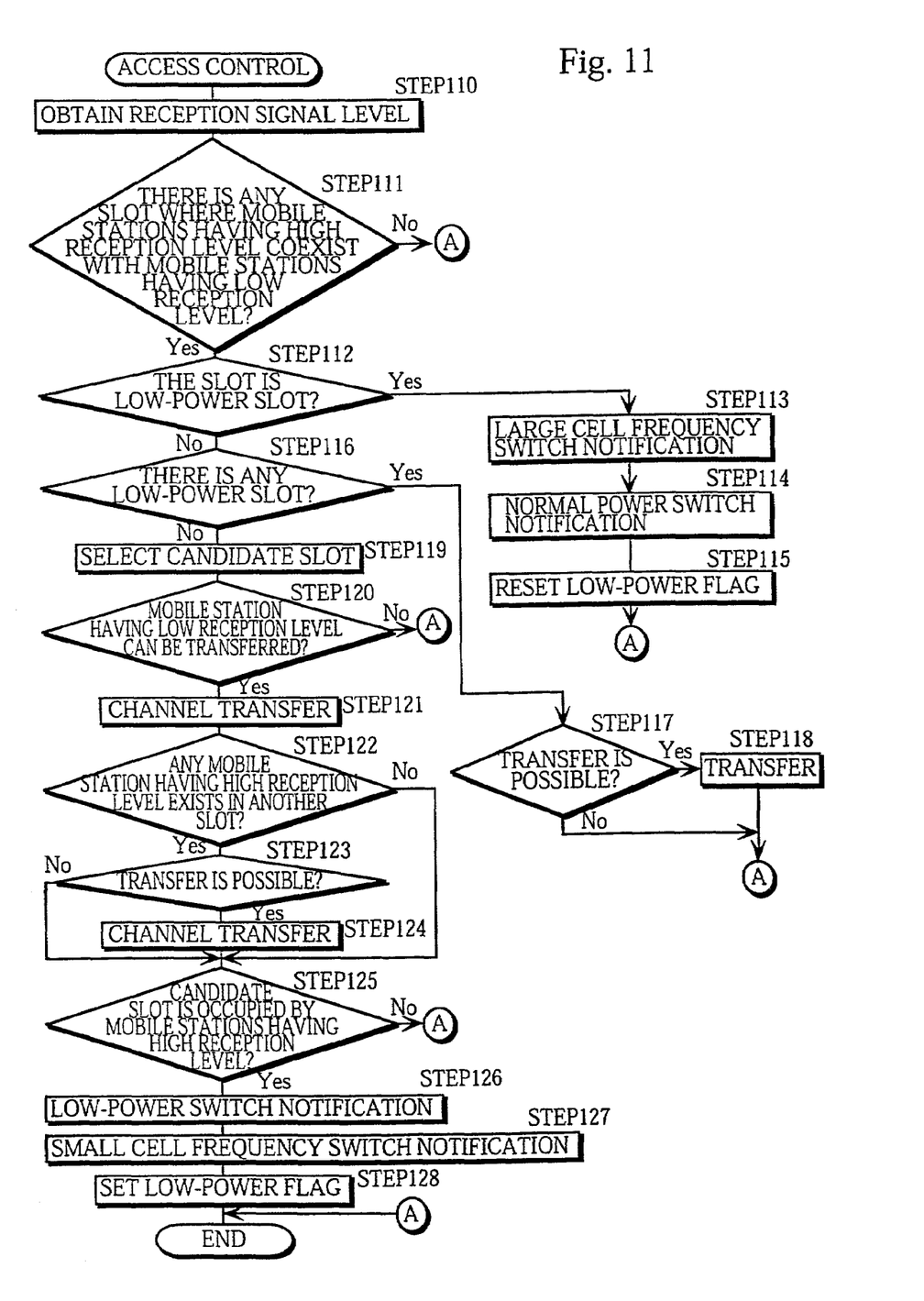
FIG. 11 is a detailed flowchart showing the operation of an access control unit.

FIG. 11 is a flowchart showing the detailed operation of the access control unit 3. The processing in this flowchart is performed once every 100 ms, for instance, by the access control unit 3.

As shown in this drawing, the access control unit 3 receives the reception signal level of each mid-communication mobile station from the reception level detecting unit 23 (step 110). The access control unit 3 then judges whether each reception level is at least equal to a threshold value and judges whether there is any time division channel (hereinafter also simply referred to as the "slot") where mobile stations having a reception level that is at least equal to the threshold value coexist with mobile stations having a reception level under the threshold value (step 111). It should be noted here that each time division channel where mobile stations having a reception level no less than the threshold value coexist with mobile stations having a reception level under the threshold value is hereinafter referred to as the "coexisting time division channel".

If there is no coexisting time division channel, the access control unit 3 terminates the processing. If there is at least one coexisting time division channel, the access control unit 3 judges whether the time division channel is a low-power slot (step 112).

If the judgement result in step 112 is affirmative, the access control unit 3 sends a large cell frequency switch notification to the frequency control unit 5 (step 113), sends a normal power switch notification to the transmission power control unit 4 (step 114), and resets a low-power flag corresponding to the time division channel (step 115). Here, a plurality of low-power flags are provided for respective time division channels in the assignment table 31 and each low-power flag shows whether the transmission power of the corresponding time division channel is set at the low level or the normal level. If a mobile station that is currently communicating with the radio base station within a small cell is moving away from the radio base station and is going out of the small cell, the transmission power of the time division channel is increased to the normal level by the large cell frequency switch notification sent in step 113 and the normal power switch notification sent in step 114.

If the judgement result in step 112 is negative, it is then judged whether any time division channel is used as a low-power slot (step 116) and whether any vacant (unused) path channel exists in the low-power slot (step 117). If both judgement results in steps 116 and 177 are affirmative, the access control unit 3 transfers the mobile station having a reception level no less than the threshold value in the coexisting time division channel to the vacant path channel (that is, changes the assignment) (step 118). To transfer a mobile station from a current channel to a new channel, the radio base station transmits a channel switch notification to the mobile station and reestablishes a link with the mobile station over the new channel.

If the judgement result in step 112 is negative and no time division channel is currently used as a low-power slot, the access control unit 3 selects a slot as the candidate for the low-power slot (such a selected slot is hereinafter referred to as the "candidate slot") (step 119).

Although any time division channel may be selected as the candidate slot, it is preferable to select a time division slot, out of coexisting time division slots, to which many mobile stations having a reception level under the threshold value are assigned.

If a mobile station having a reception signal level under the threshold value can be transferred from the candidate slot to another slot, that is, if a vacant channel exists in the other slot (step 120), the access control unit 3 transfers the mobile station to the vacant channel (step 121). If a mobile station having a high reception signal level exists in a slot other than the candidate slot (step 122) and a vacant channel remains in the candidate slot (step 123), the access control unit 3 transfers the mobile station from the other slot to the candidate slot (step 124).

If every mobile station assigned to the candidate slot has a reception signal level that is at least equal to the threshold value (step 125), the access control unit 3 sends a low-power switch notification to the transmission power control unit 4 (step 126), sends a small cell frequency switch notification to the frequency control unit 5 (step 127), and sets the low-power flag corresponding to the candidate slot (step 128). On receiving the low-power switch notification, the transmission power control unit 4 reduces the transmission power during the candidate slot to the low level. Also, on receiving the small cell frequency switch notification, the frequency control unit 5 changes the frequency in the candidate slot to a small cell frequency.

<Operation of Radio Base Station>

The following is a description of the operation of the present radio base station having the stated construction.

The following description is based on the assumption that mobile stations PS1–PS10 are wirelessly connected to the radio base station, as shown in FIG. 9A. The radio area within the solid line in FIG. 9A represents an area (a large cell) in which communication can take place with a non-directional pattern that is generated by a conventional radio base station using a normal power (500 mW). In the case where a directivity pattern is generated by the present adaptive array radio base station using a normal power (the total power of four antennas per mobile station is 125 mW), the area within the solid line also represents the extent to which a mobile station can move away from the radio base station in the direction of the directivity pattern, with communication taking place. Each mobile station shown in FIG. 9A is assigned a channel as shown in the assignment table 31 in FIG. 10A.

Because PS3 and PS5 in FIG. 10A are located near the radio base station, the signal transmitted from each of these mobile stations is received at a reception signal level that is at least equal to the threshold value.

The access control unit 3 obtains the reception signal level of each mobile station from the reception level detecting unit 23, finds that the slots 1 and 3 are coexisting time division channels, and sets the channel 3 including many vacant channels as the candidate slot.

The access control unit 3 changes the channels assigned to mobile stations one at a time as necessary so that mobile stations having a reception signal level no less than the threshold value occupy the candidate slot Tch3.

More specifically, PS5 is first transferred from the slot Tch1 to the slot Tch3. This transfer is carried out by the radio base station issuing a channel transfer designation to the PS5 and establishing a link channel with PS5 in the candidate slot Tch3. As a result, the assignment table 31 is changed as shown in FIG. 10B.

Because PS7 having a reception signal level under the threshold value exists in the candidate slot Tch3, the access control unit 3 transfers the channel assigned to PS7 from the candidate slot Tch3 to the slot Tch1. As a result, the assignment table 31 is changed as shown in FIG. 10C.

Figure 10D:
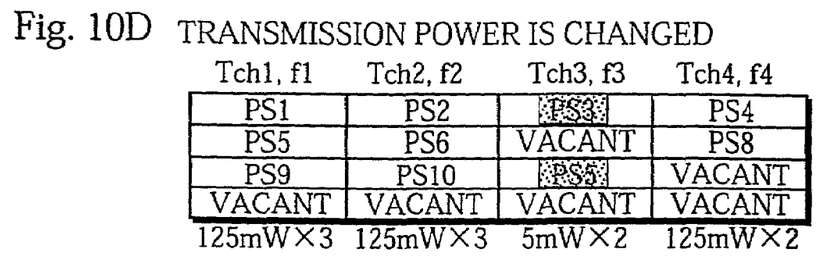

In the assignment table 31 shown in FIG. 10C, only mobile stations having a reception signal level that is at least equal to the threshold value occupy the candidate slot Tch3. Therefore, the access control unit 3 issues a low-power switch notification to the transmission power control unit 4, which then changes the transmission power for Tch3 to 5 mW per mobile station. Consequently, the assignment table 31 is changed as shown in FIG. 10D.

Figure 10E:
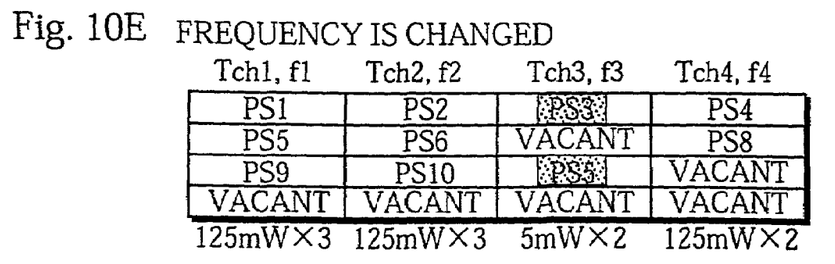

The access control unit 3 also issues a small cell frequency switch notification to the frequency control unit 5, which then changes the frequency for the slot Tch3 to a small cell frequency f5. As a result, the assignment table 31 is changed as shown in FIG. 10E.

In this manner, the access control unit 3 changes the assignment of channels to mobile stations so that the mobile stations located near the radio base station occupy the same slot, and the transmission power for the slot is reduced to the low level. By doing so, the present radio base station avoids interference with frequencies of nearby radio base stations.

Although transmission power is switched between two levels in the above embodiment, transmission power may be switched between many levels. If transmission power at four levels, which correspond to 500 mW, 100 mW, 20 mW, and 5 mW in the case of a non-directional pattern, is switched, first, second, and third threshold values can be predetermined with reference to the reception signal levels that would be obtained from mobile stations located at the rims of respective radio areas corresponding to 100 mW, 20 mW, and 5 mW. In this case, the access control unit 3 is modified to change channels so that the mobile stations having a reception signal level falling within the same range between the threshold values occupy the same slot.

The transmission power "500 mW, 100 mW, 20 mW, and 5 mW" in the case of a non-directional pattern respectively correspond to the total transmission power "125 mw, 25 mW, 5 mW, and 1 mW" of four antennas per mobile station in the case of an adaptive array having four antennas, and respectively correspond to the total transmission power "62.5 mw, 12.5 mW, 2.5 mW, and 0.5 mW" of eight antennas per mobile station in the case of an adaptive array having eight antennas.

Although the adaptive array radio base station in the above embodiment has four antennas, the present invention is not limited to this. That is, any number of antennas, such as eight antennas, may be used so long as an adaptive array apparatus includes at least two antennas.

In the above embodiment, the total transmission power of four antennas per user is set as 125 mW. Therefore, if two users are multiplexed in one slot, the total transmission power of four antennas for the two users becomes 250 mW. However, if a slot is occupied by only two users who are located far from the base station, the total transmission power of four antennas for these users may be set as 500 mW (250 mW per user). More specifically, in the above embodiment, the radio base station may transfer users having a reception level under a threshold value to a slot, all of whose channels seem to be vacant, and, if vacant channels remain in the slot after the transfer, increase the transmission power for the users assigned the slot.

In the above embodiment, if a slot is set as a low-power slot, the frequency for the slot is changed to a small cell frequency. However, a large cell frequency may be continuously used for the low-power slot.

Although only one threshold value is used in the above embodiment, two different threshold values may be used. In such a case, one of these threshold values is used to detect each mobile station entering into a small cell and the other of these threshold values is used to detect each mobile station leaving a small cell.

In the above embodiment, the present invention is applied to a PHS (personal handyphone system) telephone system. However, the present invention may be applied to any other type of mobile communication using a time division multiplex method.

It is preferable that antennas are concentrically arranged about a center with constant intervals in between. However, the antennas may be arranged in any other way.

The reception level detecting unit may detect reception signal levels according to the electric field strength signals detected for a predetermined period or longer.

INDUSTRIAL USE POSSIBILITY

The radio base station of the present invention wirelessly connects a plurality of mobile stations in each time slot of a time division multiplex method by space-multiplexing a plurality of transmission signals having different directivity patterns of an adaptive array method. This radio base station includes a table showing the assignment of time slots to mobile stations that are mid-communication, judges whether the reception signal level measured for each mid-communication mobile station is at least equal to a threshold value, and changes the assignment and the table so that the mobile stations having a reception level that is at least equal to the threshold value occupy the same time slot. The transmission power during this time slot is reduced to a level that is lower than the transmission power of other time slots. Therefore, the radio base station of the present invention is suitable for avoiding interference with the transmission waves of nearby radio base stations.

The invention claimed is:

1. A radio base station for wirlessly connecting mobile stations in each time slot of a time division multiplex method by space-multiplexing a plurality of transmission signals having different directivity patterns of an adaptive array method, the radio base station comprising:
a storage means for storing a table showing how time slots are assigned to the mobile stations that am wirelessly connected;
a measuring means for measuring a reception level of a signal received from each mobile station shown in the table;
a judging means for judging whether the reception level is no less than a threshold value;
a changing means for changing an assignment of the mobile stations and the table so that mobile stations which each have a reception level no less than the threshold value occupy a same time slot; and
a control means for reducing a transmission power during a time slot, which is occupied by the mobile stations that each have a reception level no less than the threshold value, to a level that is lower than the transmission power of other time slots.

2. The radio base station of claim 1,
wherein if the judging means judges that the reception level of any mobile station in the time slot, which is occupied by the mobile stations that each have a reception level no less than the threshold value, falls below the threshold value due to a movement of the mobile station, the control means puts the transmission power, the time slot, back to an original level.

3. The radio base station of one of claim 2 and further comprising:
a signal processing unit for calculating a plurality of parameters used for space-multiplexing, the plurality of sets of parameters respectively corresponding to a plurality of antennas composing an adaptive array antenna,
wherein the measuring means includes:
an electric filed strength detecting means for detecting an electric field strength of a signal received in each time slot; and
a reception level detecting means for detecting a reception level of a signal received from each mobile station, which is space multiplexed in each time slot according to the detected electric field strength and the calculated plurality of sets of parameters.

4. The radio base station of claim 1 further comprising:
a signal processing unit for calculating, a plurality of parameters used for space-multiplexing, the plurality of sets of parameters respectively corresponding to a plurality of antennas comprising an adaptive array antenna,
wherein the measuring means includes:
an electric filed strength detecting means for detecting an electric field strength of a signal received in each time slot; and
a reception level detecting means for detecting a reception level of a signal received from each mobile station, which is space multiplexed in each time slot according to the detected electric field strength and the calculated plurality of sets of parameters.

5. The radio base station of claim 1,
wherein the control means changes a frequency during the time slot occupied by the mobile stations that each have a reception level no less than the threshold value to a frequency used for a low-power transmission.

6. A wireless network comprising:
a plurality of mobile stations with time division multiple access (TDMA) capability; and
a base station comprising:
a radio capable of communicating with the plurality of mobile stations;
an antenna array electrically connected to the radio for transmitting and receiving radio waves;
an electric field detecting unit that detects an electric field strength at the radio;
a signal processing unit that uses the electric field strength to process signals from the radio and determine a signal level for each of the plurality of mobile stations;
an access control unit that assigns each of the plurality of mobile stations to a time slot based on its signal level, wherein the access control unit assigns more than one mobile radio to a single time slot; and
a transmission power control unit that adjusts transmission power based on the signal level of the mobile radio assigned to the time slot, and wherein the transmission power control unit adjusts transmission power based on the lowest signal level assigned to the single time slot.

* * * * *